US012716113B2

(12) United States Patent
Guo et al.

(10) Patent No.: US 12,716,113 B2
(45) Date of Patent: Aug. 25, 2026

(54) METHOD FOR RECYCLING IRON ORE TAILING AND USE THEREOF

(71) Applicant: Baotou Research Institute of Rare Earths, Baotou (CN)

(72) Inventors: Chunlei Guo, Baotou (CN); Na Li, Baotou (CN); Yufang Qin, Baotou (CN); Biao Chen, Baotou (CN); Yanjiang Liu, Baotou (CN)

(73) Assignee: Baotou Research Institute of Rare Earths, Baotou (CN)

( * ) Notice: Subject to any disclaimer, the term of this patent is extended or adjusted under 35 U.S.C. 154(b) by 391 days.

(21) Appl. No.: 18/442,527

(22) Filed: Feb. 15, 2024

(65) Prior Publication Data

US 2025/0011900 A1 Jan. 9, 2025

(30) Foreign Application Priority Data

Jul. 4, 2023 (CN) ........................ 202310811922.X

(51) Int. Cl.

| | |
|---|---|
| ***C22B 59/00*** | (2006.01) |
| ***B01D 21/00*** | (2006.01) |
| ***B03B 9/00*** | (2006.01) |
| ***C01F 11/22*** | (2006.01) |
| ***C22B 1/02*** | (2006.01) |
| ***C22B 1/24*** | (2006.01) |
| ***C22B 3/04*** | (2006.01) |
| ***C22B 3/22*** | (2006.01) |

(52) U.S. Cl.

CPC .......... *C22B 59/00* (2013.01); *B01D 21/0084* (2013.01); *B03B 9/00* (2013.01); *C01F 11/22* (2013.01); *C22B 1/02* (2013.01); *C22B 1/24* (2013.01); *C22B 3/04* (2013.01); *C22B 3/22* (2013.01)

(58) Field of Classification Search

CPC .. C22B 59/00; C22B 1/02; C22B 1/24; C22B 3/04; C22B 3/22; B01D 21/0084; B03B 9/00; C01F 11/22; B03D 1/02; B03D 1/14; B03D 1/1443; Y02P 10/20

USPC ........................................................... 75/419

See application file for complete search history.

(56) References Cited

FOREIGN PATENT DOCUMENTS

| | | | | |
|---|---|---|---|---|
| CN | 108580023 | | 9/2018 | |
| CN | 108580032 A | * | 9/2018 | ............... C22B 1/02 |
| CN | 112791847 | | 5/2021 | |

OTHER PUBLICATIONS

CN108580032A Translation (Year: 2018).*

* cited by examiner

*Primary Examiner* — Danielle M. Carda

(74) *Attorney, Agent, or Firm* — DLA Piper LLP (US)

(57) ABSTRACT

Disclosed are a method for recycling an iron ore tailing and use thereof. The method includes: 1) conditioning the iron ore tailing to obtain a first slurry, adding water glass and a sodium oleate-associated substance sequentially to the first slurry to obtain a first mixture, and subjecting the first mixture to first flotation to obtain a mixed flotation foam product and a mixed flotation grit; 2) filtering the mixed flotation foam product to obtain a solid, drying, roasting at 400° C. to 650° C., and grinding to obtain a ground product; and 3) conditioning the ground product to obtain a second slurry, adding sodium sulfide, water glass, sodium alginate, hydroxamic acid, and terpenic oil sequentially to the second slurry to obtain a second mixture, and subjecting the second mixture to second flotation to obtain a rare earth concentrate and a rare earth tailing.

13 Claims, No Drawings

METHOD FOR RECYCLING IRON ORE TAILING AND USE THEREOF

CROSS REFERENCE TO RELATED APPLICATION

This patent application claims the benefit and priority of Chinese Patent Application No. 202310811922.X filed with the China National Intellectual Property Administration on Jul. 4, 2023, the disclosure of which is incorporated by reference herein in its entirety as part of the present application.

TECHNICAL FIELD

The present disclosure relates to a method for recycling an iron ore tailing and use thereof, and in particular relates to a method for recycling a rare earth concentrate and a fluorite concentrate from an iron ore tailing, and use of sodium sulfide.

BACKGROUND

Currently, a mixed rare earth concentrate with a rare earth oxide (REO) content of 56 wt % to 58 wt % is preferentially recovered from an iron ore tailing through rare earth flotation with an REO recovery rate of 40% to 50%, and then a fluorite concentrate with a $CaF_2$ content of 85 wt % to 90 wt % is recovered from a rare earth tailing through flotation with a $CaF_2$ recovery rate of 30% to 40%.

Because rare earth minerals coexist with gangue minerals such as fluorite, rare earth minerals have similar floatability properties to gangue minerals, and an inhibitor lacks selectivity, a flotation separation effect is poor, and a separated rare earth concentrate has a high impurity content such that a large amount of a slag is produced in the subsequent smelting process of the rare earth concentrate, which is not in line with the development policy of metallurgical solid waste resource reduction advocated in China. Moreover, due to a close symbiotic relationship between rare earth minerals and fluorite minerals, a rare earth mineral bulk in an iron ore tailing exhibits a low dissociation degree, a grade of a separated rare earth concentrate still needs to be improved, and phosphorus and sulfur contents in a separated rare earth concentrate still need to be reduced.

CN108580023A discloses a method for recovering multiple components from an iron ore tailing associated with rare earth minerals, including: the iron ore tailing associated with rare earth minerals is subjected to rare earth mineral/fluorite mineral mixed flotation to obtain a mixed flotation concentrate and a mixed flotation tailing; the mixed flotation concentrate is subjected to high-intensity magnetic separation to obtain a high-intensity magnetic separation concentrate and a high-intensity magnetic separation tailing; the high-intensity magnetic separation concentrate is subjected to rare earth flotation to obtain a rare earth flotation concentrate and a rare earth flotation tailing; and the high-intensity magnetic separation tailing is subjected to fluorite flotation to obtain a fluorite flotation concentrate and a fluorite flotation tailing. It is silent on phosphorus and sulfur contents in the rare earth concentrate.

CN112791847A discloses a method for separating and recovering iron, a rare earth, and fluorine from a rare earth-containing iron ore tailing, including: the rare earth-containing iron ore tailing, an additive, and a pulverized coal are mixed, briquetted or pelleted, roasted, ball-milled, and subjected to magnetic separation to obtain a magnetic separation iron concentrate and a magnetic separation tailing; the magnetic separation tailing is subjected to leaching with hydrochloric acid, and a resulting leaching system is filtered to obtain a rare earth chloride-containing leaching solution and a calcium fluoride-rich leaching residue; water is added to the leaching residue, and stirring is performed to obtain a slurry; water glass, sodium oleate, and terpenic oil are added to the slurry, and the resulting mixture is subjected to rough selection to obtain a rough-selection concentrate and a rough-selection tailing; and the rough-selection concentrate is subjected to fine selection to obtain a calcium fluoride concentrate and a total tailing including a mixture of a silicate and a small amount of calcium fluoride.

SUMMARY

A first object of the present disclosure is to provide a method for recycling an iron ore tailing. The method of the present disclosure could significantly reduce a phosphorus content (in terms of $P_2O_5$) and a sulfur content in a separated rare earth concentrate. Further, the method of the present disclosure could result in a rare earth concentrate and a fluorite concentrate, separately. A second object of the present disclosure is to provide use of sodium sulfide in treatment of an iron ore tailing with an improved grade of a separated rare earth concentrate and reduced $P_2O_5$ and S contents in the separated rare earth concentrate.

The first object of the present disclosure is achieved by the following technical solutions:

The present disclosure provides a method for recycling an iron ore tailing, including the following steps:

1) conditioning the iron ore tailing to obtain a first slurry, adding water glass and a sodium oleate-associated substance sequentially to the first slurry to obtain a first mixture, and subjecting the first mixture to first flotation to obtain a mixed flotation foam product and a mixed flotation grit;
2) filtering the mixed flotation foam product to obtain a solid, drying the solid to obtain a dried solid, roasting the dried solid at a temperature of 400° C. to 650° C. to obtain a roasted product, and grinding the roasted product to obtain a ground product; and
3) conditioning the ground product to obtain a second slurry, adding sodium sulfide, water glass, sodium alginate, hydroxamic acid, and terpenic oil sequentially to the second slurry to obtain a second mixture, and subjecting the second mixture to second flotation to obtain a rare earth concentrate and a rare earth tailing, wherein in step 1), based on a weight of the iron ore tailing, the water glass is added in an amount of 0.1 kg/t to 6.0 kg/t, and the sodium oleate-associated substance is added in an amount of 0.1 kg/t to 1.0 kg/t;

in step 3), based on the weight of the iron ore tailing, the sodium sulfide is added in an amount of 0.1 kg/t to 2.0 kg/t, the water glass is added in an amount of 0.1 kg/t to 6.0 kg/t, the sodium alginate is added in an amount of 0.01 kg/t to 0.3 kg/t, the hydroxamic acid is added in an amount of 0.1 kg/t to 1.5 kg/t, and the terpenic oil is added in an amount of 0.03 kg/t to 0.20 kg/t; the hydroxamic acid is at least one selected from the group consisting of salicylhydroxamic acid and o-hydroxynaphthalene methylhydroxamic acid; and the sodium oleate-associated substance is selected from the group consisting of sodium oleate and a sodium oleate-modified product.

According to some embodiments of the method of the present disclosure, in the iron ore tailing, a total Fe (TFe) content is in a range of 10 wt % to 15 wt %, a rare earth oxide (REO) content is in a range of 7 wt % to 10 wt %, a $CaF_2$ content is in a range of 20 wt % to 25 wt %, a $P_2O_5$ content is in a range of 2.5 wt % to 6.5 wt %, and an S content is in a range of 1.5 wt % to 3.0 wt %.

According to some embodiments of the method of the present disclosure, in step 1), the first slurry has a concentration of 30 wt % to 45 wt %; during the first flotation, a pH value of the first slurry is adjusted to 8 to 9.5; and the first flotation is conducted at a temperature of 20° C. to 35° C.

According to some embodiments of the method of the present disclosure, in step (2), the roasting is conducted for 1 h to 5 h; and a particle size of the ground product is controlled such that particles in the ground product that are able to pass through a 38 μm sieve account for 80 wt % to 90 wt %.

According to some embodiments of the method of the present disclosure, in step 3), the second slurry has a concentration of 50 wt % to 70 wt %; during the second flotation, a pH value of the second slurry is adjusted to 8 to 9; and the second flotation is conducted at a temperature of 50° C. to 90° C.

In some embodiments, the method further includes the following step:

4) conditioning the rare earth tailing to obtain a third slurry; adding the water glass, a polyphenol derivative, and the sodium oleate-associated substance sequentially to the third slurry to obtain a third mixture, and subjecting the third mixture to third flotation including one time of rough selection and multiple times of fine selection to obtain a fluorite concentrate and a fluorite tailing, wherein based on the weight of the iron ore tailing, the water glass is added in an amount of 0.1 kg/t to 6.0 kg/t, the polyphenol derivative is added in an amount of 0.05 kg/t to 1.0 kg/t, and the sodium oleate-associated substance is added in an amount of 0.1 kg/t to 1.0 kg/t.

According to some embodiments of the method of the present disclosure, in step 4), the third slurry has a concentration of 30 wt % to 45 wt %; during the third flotation, a pH value of the third slurry is adjusted to 8 to 9.5; and the third flotation is conducted at a temperature of 20° C. to 40° C.

According to some embodiments of the method of the present disclosure, in step 1) and step 4), the sodium oleate-associated substance is sodium oleate; and the polyphenol derivative is at least one selected from the group consisting of tannin, a tannin extract, and gallic acid.

In some embodiments, the method of the present disclosure further includes the following step: combining the fluorite tailing with the mixed flotation grit to obtain a final tailing.

The present disclosure also provides use of sodium sulfide in treatment of an iron ore tailing with an improved grade of a separated rare earth concentrate and reduced $P_2O_5$ and S contents in the separated rare earth concentrate.

When the method of the present disclosure is used to allow mixed flotation of a rare earth and fluorite from an iron ore tailing, a grade of a separated rare earth concentrate could be improved and a $P_2O_5$ content and an S content in the separated rare earth concentrate could be reduced. A fluorite concentrate produced by the method of the present disclosure also has a high grade. Further, the roasting-grinding of a mixed flotation foam and the addition of a specific flotation additive in the method of the present disclosure could promote the improvement of grades of a rare earth concentrate and a fluorite concentrate, allow for the effective separation of a rare earth, fluorite, and other gangue minerals, and reduce a $P_2O_5$ content and an S content in a separated rare earth concentrate.

DETAILED DESCRIPTION OF THE EMBODIMENTS

The present disclosure will be further described below in conjunction with specific embodiments, but the scope of the present disclosure is not limited thereto.

Those skilled in the art know that a post-treatment of a rare earth concentrate is generally acidification and roasting. If a sulfur content in a rare earth concentrate is too high, a ring forming phenomenon would occur during roasting. If a phosphorus content in a rare earth concentrate is too high, the consumption of an iron powder would be increased. A rare earth concentrate is required to have a specified iron-phosphorus ratio during roasting, and a high phosphorus content corresponds to high consumption of an iron powder. Therefore, during the process of treating an iron ore tailing to obtain a rare earth concentrate and a fluorite concentrate in the present disclosure, a phosphorus content and a sulfur content are specially controlled to reduce a phosphorus content and a sulfur content in the obtained rare earth concentrate while obtaining a rare earth concentrate with a high grade. The method of the present disclosure could also result in a fluorite concentrate with a high $CaF_2$ grade.

The method for recycling an iron ore tailing in the present disclosure includes: 1) flotation of the iron ore tailing; 2) roasting and grinding; and 3) acquisition of a rare earth concentrate. Optionally, the method further includes: 4) acquisition of a fluorite concentrate and 5) acquisition of a final tailing. A detailed description is given below.

Flotation of the Iron Ore Tailing

The iron ore tailing is conditioned to obtain a first slurry, and water glass and a sodium oleate-associated substance are added sequentially to the first slurry to obtain a first mixture. The first mixture is subjected to first flotation to obtain a mixed flotation foam product and a mixed flotation grit.

In some embodiments, in the iron ore tailing of the present disclosure, a TFe content is in a range of 10 wt % to 15 wt %, preferably 11 wt % to 15 wt %, and more preferably 12 wt % to 14 wt %; an REO content is in a range of 7 wt % to 10 wt %, preferably 8 wt % to 10 wt %, and more preferably 9 wt % to 9.5 wt %; a $CaF_2$ content is in a range of 20 wt % to 25 wt %, preferably 20 wt % to 23 wt %, and more preferably 20 wt % to 21 wt %; a $P_2O_5$ content is in a range of 2.0 wt % to 6.5 wt %, preferably 2.35 wt % to 5.84 wt %, and more preferably 2.5 wt % to 5.0 wt %; and an S content is in a range of 1.5 wt % to 3.0 wt %, preferably 1.80 wt % to 2.5 wt %, and more preferably 1.88 wt % to 1.94 wt %. The method of the present disclosure is applicable to the above iron ore tailing. When used to treat the above iron ore tailing, the method of the present disclosure could reduce a $P_2O_5$ content and an S content in a separated rare earth concentrate while improving a grade of the separated rare earth concentrate and could also recover a fluorite concentrate with a high grade. In the present disclosure, the phosphorus content is expressed in terms of a $P_2O_5$ content.

In some embodiments, the first slurry has a concentration of 30 wt % to 45 wt %, preferably 32 wt % to 40 wt %, and more preferably 35 wt % to 38 wt %. Based on a weight of the iron ore tailing, the water glass is added in an amount of 0.1 kg/t to 6.0 kg/t, preferably 0.8 kg/t to 4.0 kg/t, and more preferably 1.5 kg/t to 2.5 kg/t. Based on the weight of the iron ore tailing, the sodium oleate-associated substance could be added in an amount of 0.1 kg/t to 1.0 kg/t, preferably 0.3 kg/t to 0.9 kg/t, and more preferably 0.5 kg/t to 0.7 kg/t.

In the present disclosure, the sodium oleate-associated substance is selected from the group consisting of sodium oleate and a sodium oleate-modified product, and is preferably sodium oleate. A source of sodium oleate is not particularly limited. In some embodiments, the sodium oleate-modified product could be purchased from Inner Mongolia Xinbao High-tech Development Co., Ltd. (China), with a model of SF; or could be purchased from Baotou Mengrong Fine Materials Co., Ltd. (China), with a model of 506F.

In some embodiments, during the first flotation, a pH value of the first slurry is adjusted to 8 to 9.5 and preferably 8.5 to 9.5. In some embodiments, the first flotation is conducted at a temperature of 20° C. to 35° C., preferably 25° C. to 35° C., and more preferably 30° C. to 35° C.

In some embodiments, in this step, the first flotation includes one time of rough selection and multiple times of fine selection, and preferably is one time of rough selection and two times of fine selection, namely, one-rough selection and two-fine selection flotation. The one-rough selection and two-fine selection flotation means that one time of rough selection is conducted first and two times of fine selection are then conducted. For the one time of rough selection and two times of fine selection, the same flotation agent is used, and the same flotation conditions are adopted. Middlings produced during the one-rough selection and two-fine selection flotation are returned sequentially to improve a recovery rate and reduce a loss.

Roasting and Grinding

The mixed flotation foam product is filtered to obtain a solid, the solid is dried and then roasted to obtain a roasted product, and the roasted product is ground to obtain a ground product. This is conducive to acquisition of a rare earth concentrate with a high rare earth grade and reduced $P_2O_5$ and S contents.

The roasting is conducted at a temperature of 400° C. to 650° C., preferably 450° C. to 620° C., and more preferably 500° C. to 610° C., such as 520° C., 550° C., 580° C., or 600° C. In some embodiments, the roasting is conducted for 1 h to 5 h, preferably 2 h to 5 h, and more preferably 3 h to 4 h.

In some embodiments, a particle size of the ground product is controlled such that particles in the ground product that are able to pass through a 38 μm sieve account for 80 wt % to 90 wt %, and preferably 85 wt % to 90 wt %. In some embodiments, a grinding device is a stirring mill, a medium loaded is a ceramic spherical particle. In some embodiments, a loading rate of the medium is in a range of 35% to 45%, and preferably 40% to 45%.

Acquisition of a Rare Earth Concentrate

The ground product is conditioned to obtain a second slurry, and sodium sulfide, water glass, sodium alginate, hydroxamic acid and terpenic oil are added sequentially to the second slurry to obtain a second mixture. The second mixture is subjected to second flotation to obtain a rare earth concentrate and a rare earth tailing. In the present disclosure, the addition of the specified flotation additives in this way helps to improve a rare earth grade of a separated rare earth concentrate and reduce a $P_2O_5$ content and an S content in the separated rare earth concentrate. The present disclosure has surprisingly found that the addition of sodium sulfide in combination with other specific additives is conducive to achieving the objects of the present disclosure.

In some embodiments, the second slurry has a concentration of 50 wt % to 70 wt %, preferably 55 wt % to 70 wt %, and more preferably 60 wt % to 65 wt %.

Based on the weight of the iron ore tailing, the sodium sulfide is added in an amount of 0.1 kg/t to 2.0 kg/t, preferably 0.4 kg/t to 1.5 kg/t, and more preferably 0.5 kg/t to 1.1 kg/t.

Based on the weight of the iron ore tailing, the water glass is added in an amount of 0.1 kg/t to 6.0 kg/t, preferably 0.9 kg/t to 5.0 kg/t, and more preferably 1.8 kg/t to 3.0 kg/t, such as 1.0 kg/t, 2.0 kg/t, or 2.5 kg/t.

Based on the weight of the iron ore tailing, the sodium alginate is added in an amount of 0.01 kg/t to 0.3 kg/t, preferably 0.1 kg/t to 0.3 kg/t, and more preferably 0.15 kg/t to 0.25 kg/t.

Based on the weight of the iron ore tailing, the hydroxamic acid is added in an amount of 0.1 kg/t to 1.5 kg/t, preferably 0.5 kg/t to 1.3 kg/t, and more preferably 0.8 kg/t to 1.1 kg/t. The hydroxamic acid is at least one selected from the group consisting of salicylhydroxamic acid and o-hydroxynaphthalene methylhydroxamic acid and is preferably o-hydroxynaphthalene methylhydroxamic acid.

Based on the weight of the iron ore tailing, the terpenic oil is added in an amount of 0.03 kg/t to 0.20 kg/t, preferably 0.1 kg/t to 0.20 kg/t, and more preferably 0.13 kg/t to 0.16 kg/t.

In some embodiments, during the second flotation, a pH value of the second slurry is adjusted to 8 to 9. In some embodiments, the second flotation is conducted at a temperature of 50° C. to 90° C., preferably 60° C. to 85° C., and more preferably 70° C. to 80° C.

In some embodiments, in this step, the second flotation includes one time of rough selection and multiple times of fine selection, and preferably one time of rough selection and two times of fine selection, namely, one-rough selection and two-fine selection flotation. The one-rough selection and two-fine selection flotation means that one time of rough selection is conducted first and then two times of fine selection are conducted. Middlings produced during the one-rough selection and two-fine selection flotation are returned sequentially to improve a recovery rate and reduce a loss.

In the rare earth concentrate, an REO content is higher than 60 wt %, a $CaF_2$ content is lower than 5.0 wt %, a $P_2O_5$ content is lower than 6.5 wt %, and an S content is lower than 0.2 wt %.

Acquisition of a Fluorite Concentrate

In some embodiments, the rare earth tailing is conditioned to obtain a third slurry; the water glass, a polyphenol derivative, and the sodium oleate-associated substance are added sequentially to the third slurry to obtain a third mixture. The third mixture is subjected to third flotation including one time of rough selection and multiple times of fine selection to obtain a fluorite concentrate and a fluorite tailing. This could achieve a fluorite concentrate with a high $CaF_2$ grade and improve a recovery rate.

In some embodiments, the third slurry has a concentration of 30 wt % to 45 wt %, preferably 35 wt % to 45 wt %, and more preferably 35 wt % to 40 wt %.

In some embodiments, based on the weight of the iron ore tailing, the water glass is added in an amount of 0.1 kg/t to 6.0 kg/t, preferably 0.3 kg/t to 4.0 kg/t, and more preferably 0.5 kg/t to 2.5 kg/t.

In some embodiments, based on the weight of the iron ore tailing, the polyphenol derivative is added in an amount of 0.05 kg/t to 1.0 kg/t, preferably 0.1 kg/t to 2.0 kg/t, and more preferably 0.15 kg/t to 1.0 kg/t, such as 0.15 kg/t, 0.2 kg/t, or 0.25 kg/t. In some embodiments, the polyphenol derivative is at least one selected from the group consisting of tannin, a tannin extract, and gallic acid, and is preferably tannin or gallic acid.

In some embodiments, based on the weight of the iron ore tailing, the sodium oleate-associated substance is added in an amount of 0.1 kg/t to 1.0 kg/t, preferably 0.3 kg/t to 0.8 kg/t, and more preferably 0.4 kg/t to 0.6 kg/t. In some embodiments, the sodium oleate-associated substance is selected from the group consisting of sodium oleate and a sodium oleate-modified product and is preferably sodium oleate. In some embodiments, the sodium oleate-modified product is purchased from Inner Mongolia Xinbao High-tech Development Co., Ltd. (China), with a model of SF; or is purchased from Baotou Mengrong Fine Materials Co., Ltd. (China), with a model of 506F.

In some embodiments, during the third flotation, a pH value of the third slurry is adjusted to 8 to 9.5 and preferably 8.5 to 9.5. In some embodiments, the third flotation is conducted at a temperature of 20° C. to 40° C., preferably 25° C. to 40° C., and more preferably 30° C. to 40° C.

In some embodiments, the third flotation including one time of rough selection and multiple times of fine selection includes one time of rough selection and four times or more of fine selection, such as one time of rough selection and eight times of fine selection, namely, one-rough selection and eight-fine selection flotation. The one-rough selection and eight-fine selection flotation means that one time of rough selection is conducted first and eight times of fine selection are then conducted. Middlings are then combined and returned to rough selection of the closed-circuit flow to improve a $CaF_2$ recovery rate and reduce a loss.

Acquisition of a Final Tailing

The fluorite tailing is combined with the mixed flotation grit to obtain a final tailing.

The present disclosure also provides use of sodium sulfide in treatment of an iron ore tailing with an improved grade of a separated rare earth concentrate and reduced $P_2O_5$ and S contents in the separated rare earth concentrate, including the following steps:

1) the iron ore tailing is conditioned to obtain a first slurry, water glass and a sodium oleate-associated substance are added sequentially to the first slurry to obtain a first mixture, and the first mixture is subjected to first flotation to obtain a mixed flotation foam product and a mixed flotation grit;
2) the mixed flotation foam product is filtered to obtain a solid, the solid is dried and then roasted at a temperature of 400° C. to 650° C. to obtain a roasted product, and the roasted product is ground to obtain a ground product; and
3) the ground product is conditioned to obtain a second slurry, sodium sulfide, water glass, sodium alginate, hydroxamic acid, and terpenic oil are added sequentially to the second slurry to obtain a second mixture, and the second mixture is subjected to second flotation to obtain a rare earth concentrate and a rare earth tailing, wherein in step 1), based on a weight of the iron ore tailing, the water glass is added in an amount of 0.1 kg/t to 6.0 kg/t, and the sodium oleate-associated substance is added in an amount of 0.1 kg/t to 1.0 kg/t;

in step 3), based on the weight of the iron ore tailing, the sodium sulfide is added in an amount of 0.1 kg/t to 2.0 kg/t, the water glass is added in an amount of 0.1 kg/t to 6.0 kg/t, the sodium alginate is added in an amount of 0.01 kg/t to 0.3 kg/t, the hydroxamic acid is added in an amount of 0.1 kg/t to 1.5 kg/t, and the terpenic oil is added in an amount of 0.03 kg/t to 0.20 kg/t; the hydroxamic acid is at least one selected from the group consisting of salicylhydroxamic acid and o-hydroxynaphthalene methylhydroxamic acid; and the sodium oleate-associated substance is selected from the group consisting of sodium oleate and a sodium oleate-modified product.

A detailed description can be seen above and will not be repeated here.

Test methods are described as follows:

REO content: it is determined according to a method described in the Chinese national standard GB/T 18114.1-2010.

$CaF_2$ content: it is determined according to a method described in the Chinese national standard GB/T 5195.1-2017.

TFe content: it is determined according to a method described in the Chinese national standard GB/T 6730.5-2022.

$P_2O_5$ content: it is determined according to a method described in the Chinese national standard GB/T 18114.9-2010.

S content: it is determined according to a method described in the Chinese national standard GB/T 6730.61-2022.

Example 1

An iron ore tailing from Baogang Baiyun beneficiation Branch Company (China) was adopted as a raw material. In the iron ore tailing, a TFe content was 11.96 wt %, an REO content was 9.57 wt %, a $CaF_2$ content was 20.15 wt %, a $P_2O_5$ content was 3.45 wt %, and an S content was 1.9 wt %.

The iron ore tailing was conditioned, obtaining a first slurry with a concentration of 35 wt %. At 30° C., water glass at 2.0 kg/t and sodium oleate at 0.5 kg/t were added sequentially to the first slurry. A pH value of the first slurry was adjusted to 9.5, obtaining a first mixture. The first mixture was subjected to a closed-circuit flow of one-rough selection and two-fine selection flotation, and sequential return of middlings, obtaining a mixed flotation foam product and a mixed flotation grit.

The mixed flotation foam product was filtered, obtaining a solid, the solid was dried and then roasted at 600° C. for 4 h, obtaining a roasted product. The roasted product was ground, obtaining a ground product. A particle size of the ground product was controlled such that particles in the ground product that could pass through a 38 μm sieve accounted for 85 wt %.

The ground product was conditioned, obtaining a second slurry with a concentration of 60 wt %. At 70° C., sodium sulfide at 0.5 kg/t, water glass at 2.0 kg/t, sodium alginate at 0.15 kg/t, o-hydroxynaphthalene methylhydroxamic acid at 0.8 kg/t, and terpenic oil at 0.15 kg/t were added sequentially to the second slurry and a pH value of the second slurry was adjusted to 9.0, obtaining a second mixture. The second mixture was subjected to a closed-circuit flow of one-rough selection and two-fine selection flotation, and sequential return of middlings, obtaining a rare earth concentrate and a rare earth tailing.

The rare earth tailing was conditioned, obtaining a third slurry with a concentration of 35 wt %. At 30° C., water glass at 0.5 kg/t, tannin at 0.25 kg/t, and sodium oleate at 0.4 kg/t were added sequentially to the third slurry and a pH value of the third slurry was adjusted to 9.5, obtaining a third mixture. The third mixture was subjected to a closed-circuit flow of one-rough selection and eight-fine selection flotation, and combination and return to rough selection of middlings, obtaining a fluorite concentrate and a fluorite tailing.

The fluorite tailing was combined with the mixed flotation grit, obtaining a final tailing.

Comparative Example 1

This comparative example was different from Example 1 merely in that the roasting-grinding procedure was omitted.

Comparative Example 2

This comparative example was different from Example 1 merely in that water glass at 2.0 kg/t, sodium alginate at 0.15 kg/t, o-hydroxynaphthalene methylhydroxamic acid at 0.8 kg/t, and terpenic oil at 0.15 kg/t were added sequentially to the second slurry, that is to say, sodium sulfide was omitted.

Example 2

An iron ore tailing from Baogang Baiyun beneficiation Branch Company (China) was adopted as a raw material. In the iron ore tailing, a TFe content was 13.36 wt %, an REO content was 8.57 wt %, a $CaF_2$ content was 23.51 wt %, a $P_2O_5$ content was 3.80 wt %, and an S content was 1.88 wt %.

The iron ore tailing was conditioned, obtaining a first slurry with a concentration of 40 wt %. At 35° C., water glass at 2.5 kg/t and sodium oleate at 0.5 kg/t were added sequentially to the first slurry and a pH value of the first slurry was adjusted to 9.0, obtaining a first mixture. The first mixture was subjected to a closed-circuit flow of one-rough selection and two-fine selection flotation, and sequential return of middlings, obtaining a mixed flotation foam product and a mixed flotation grit.

The mixed flotation foam product was filtered, obtaining a solid, the solid was dried and then roasted at 550° C. for 4 h, obtaining a roasted product. The roasted product was ground, obtaining a ground product. A particle size of the ground product was controlled such that particles in the ground product that could pass through a 38 μm sieve accounted for 90 wt %.

The ground product was conditioned, obtaining a second slurry with a concentration of 55 wt %. At 75° C., sodium sulfide at 0.35 kg/t, water glass at 1.0 kg/t, sodium alginate at 0.25 kg/t, o-hydroxynaphthalene methylhydroxamic acid at 0.6 kg/t, and terpenic oil at 0.18 kg/t were added sequentially to the second slurry, and a pH value of the second slurry was adjusted to 9.0, obtaining a second mixture. The second mixture was subjected to a closed-circuit flow of one-rough selection and two-fine selection flotation, and sequential return of middlings, obtaining a rare earth concentrate and a rare earth tailing.

The rare earth tailing was conditioned, obtaining a third slurry with a concentration of 38 wt %. At 35° C., water glass at 0.8 kg/t, gallic acid at 0.15 kg/t, and sodium oleate at 0.5 kg/t were added sequentially to the third slurry, and a pH value of the third slurry was adjusted to 9.5, obtaining a third mixture. The third mixture was subjected to a closed-circuit flow of one-rough selection and eight-fine selection flotation, and combination and return to rough selection of middlings, obtaining a fluorite concentrate and a fluorite tailing.

The fluorite tailing was combined with the mixed flotation grit, obtaining a final tailing.

Example 3

An iron ore tailing from Baogang beneficiation plant (China) was adopted as a raw material. In the iron ore tailing, a TFe content was 15.36 wt %, an REO content was 7.38 wt %, a $CaF_2$ content was 20.38 wt %, a $P_2O_5$ content was 3.74 wt %, and an S content was 1.90 wt %.

The iron ore tailing was conditioned, obtaining a first slurry with a concentration of 40 wt %. At 35° C., water glass at 1.50 kg/t and sodium oleate at 0.75 kg/t were added sequentially to the first slurry, and a pH value of the first slurry was adjusted to 9.0, obtaining a first mixture. The first mixture was subjected to a closed-circuit flow of one-rough selection and two-fine selection flotation, and sequential return of middlings, obtaining a mixed flotation foam product and a mixed flotation grit.

The mixed flotation foam product was filtered, obtaining a solid, the solid was dried and then roasted at 580° C. for 4 h, obtaining a roasted product. The roasted product was ground, obtaining a ground product. A particle size of the ground product was controlled such that particles in the ground product that could pass through a 38 μm sieve accounted for 90 wt %.

The ground product was conditioned, obtaining a second slurry with a concentration of 60 wt %. At 75° C., sodium sulfide at 0.20 kg/t, water glass at 1.5 kg/t, sodium alginate at 0.05 kg/t, o-hydroxynaphthalene methylhydroxamic acid at 0.6 kg/t, and terpenic oil at 0.18 kg/t were added sequentially to the second slurry, and a pH value of the second slurry was adjusted to 9.0, obtaining a second mixture. The second mixture was subjected to a closed-circuit flow of one-rough selection and two-fine selection flotation, and sequential return of middlings, obtaining a rare earth concentrate and a rare earth tailing.

The rare earth tailing was conditioned, obtaining a third slurry with a concentration of 37 wt %. At 35° C., water glass at 0.50 kg/t, tannin at 0.25 kg/t, and sodium oleate at 0.40 kg/t were added sequentially to the third slurry, and a pH value of the third slurry was adjusted to 9.0, obtaining a third mixture. The third mixture was subjected to a closed-circuit flow of one-rough selection and eight-fine selection flotation, and combination and return to rough selection of middlings, obtaining a fluorite concentrate and a fluorite tailing.

The fluorite tailing was combined with the mixed flotation grit, obtaining a final tailing.

Example 4

An iron ore tailing from Baogang beneficiation plant (China) was adopted as a raw material. In the iron ore tailing, a TFe content was 14.63 wt %, an REO content was 6.88 wt %, a $CaF_2$ content was 20.38 wt %, a $P_2O_5$ content was 3.74 wt %, and an S content was 1.93 wt %.

The iron ore tailing was conditioned, obtaining a first slurry with a concentration of 38 wt %. At 35° C., water glass at 3.0 kg/t and sodium oleate at 1.0 kg/t were added sequentially to the first slurry and a pH value of the first slurry was adjusted to 9.5, obtaining a first mixture. The first mixture was subjected to a closed-circuit flow of one-rough selection and two-fine selection flotation, and sequential return of middlings, obtaining a mixed flotation foam product and a mixed flotation grit.

The mixed flotation foam product was filtered, obtaining a solid, the solid was dried and then roasted at 600° C. for 4 h, obtaining a roasted product. The roasted product was ground, obtaining a ground product. A particle size of the ground product was controlled such that particles in the ground product that could pass through a 38 μm sieve accounted for 88 wt %.

The ground product was conditioned, obtaining a second slurry with a concentration of 60 wt %. At 80° C., sodium sulfide at 0.50 kg/t, water glass at 2.0 kg/t, sodium alginate at 0.10 kg/t, o-hydroxynaphthalene methylhydroxamic acid at 0.8 kg/t, and terpenic oil at 0.20 kg/t were added sequentially to the second slurry, and a pH value of the second slurry was adjusted to 9.0, obtaining a second mixture. The second mixture was subjected to a closed-circuit flow of one-rough selection and two-fine selection flotation, and sequential return of middlings, obtaining a rare earth concentrate and a rare earth tailing.

The rare earth tailing was conditioned, obtaining a third slurry with a concentration of 38 wt %. At 35° C., water glass at 0.50 kg/t, tannin at 0.30 kg/t, and sodium oleate at 0.50 kg/t were added sequentially to the third slurry and a pH value of the third slurry was adjusted to 9.0, obtaining a third mixture. The third mixture was subjected to a closed-circuit flow of one-rough selection and eight-fine selection flotation, and combination and return to rough selection of middlings, obtaining a fluorite concentrate and a fluorite tailing.

The fluorite tailing was combined with the mixed flotation grit, obtaining a final tailing.

TABLE 1

| Example No. | REO content in a rare earth concentrate/ wt % | $CaF_2$ content in a rare earth concentrate/ wt % | $P_2O_5$ content in a rare earth concentrate/ wt % | S content in a rare earth concentrate/ wt % | $CaF_2$ content in a fluorite concentrate/ wt % |
|---|---|---|---|---|---|
| Example 1 | 62.35 | 4.89 | 6.30 | 0.18 | 90.35 |
| Example 2 | 60.35 | 4.52 | 6.10 | 0.13 | 92.35 |
| Example 3 | 63.28 | 4.20 | 6.26 | 0.15 | 92.58 |
| Example 4 | 60.88 | 4.65 | 6.33 | 0.16 | 93.17 |
| Comparative Example 1 | 38.36 | 25.65 | 14.50 | 2.45 | 83.25 |
| Comparative Example 2 | 52.37 | 10.09 | 11.38 | 3.20 | 85.24 |

The present disclosure is not limited to the above-mentioned embodiments. Without departing from the essence of the present disclosure, all variations, improvements, and substitutions conceivable by those skilled in the art fall within the scope of the present disclosure.

What is claimed is:

1. A method for recycling an iron ore tailing, comprising steps of first conditioning: conditioning the iron ore tailing to obtain a first slurry, adding water glass and a sodium oleate-associated substance sequentially to the first slurry to obtain a first mixture, and subjecting the first mixture to first flotation to obtain a mixed flotation foam product and a mixed flotation grit;

filtering and roasting: filtering the mixed flotation foam product to obtain a solid, drying the solid to obtain a dried solid, roasting the dried solid at a temperature of 400° C. to 650° C. to obtain a roasted product, and grinding the roasted product to obtain a ground product; and second conditioning: conditioning the ground product to obtain a second slurry, adding sodium sulfide, water glass, sodium alginate, hydroxamic acid, and terpenic oil sequentially to the second slurry to obtain a second mixture, and subjecting the second mixture to second flotation to obtain a rare earth concentrate and a rare earth tailing, wherein, in the first conditioning step, based on a weight of the iron ore tailing, the water glass is added in an amount of 0.1 kg/t to 6.0 kg/t, and the sodium oleate-associated substance is added in an amount of 0.1 kg/t to 1.0 kg/t;

wherein, in the second conditioning step, based on the weight of the iron ore tailing, the sodium sulfide is added in an amount of 0.1 kg/t to 2.0 kg/t, the water glass is added in an amount of 0.1 kg/t to 6.0 kg/t, the sodium alginate is added in an amount of 0.01 kg/t to 0.3 kg/t, the hydroxamic acid is added in an amount of 0.1 kg/t to 1.5 kg/t, and the terpenic oil is added in an amount of 0.03 kg/t to 0.20 kg/t; the hydroxamic acid is at least one selected from the group consisting of salicylhydroxamic acid and o-hydroxynaphthalene methylhydroxamic acid, wherein the weight of the iron ore tailing used in the second conditioning step is same as the weight of the iron ore tailing used in the first conditioning step; and the sodium oleate-associated substance is selected from the group consisting of sodium oleate and a sodium oleate-modified product.

2. The method as claimed in claim 1, wherein in the iron ore tailing, a total Fe (TFe) content is in a range of 10 wt % to 15 wt %, a rare earth oxide (REO) content is in a range of 7 wt % to 10 wt %, a $CaF_2$ content is in a range of 20 wt % to 25 wt %, a $P_2O_5$ content is in a range of 2.5 wt % to 6.5 wt %, and an S content is in a range of 1.5 wt % to 3.0 wt %.

3. The method as claimed in claim 2, further comprising the step of third conditioning: conditioning the rare earth tailing to obtain a third slurry, adding the water glass, a polyphenol derivative, and the sodium oleate-associated substance sequentially to the third slurry to obtain a third mixture, and subjecting the third mixture to third flotation comprising one time of rough selection and multiple times of fine selection to obtain a fluorite concentrate and a fluorite tailing, wherein based on the weight of the iron ore tailing, the water glass is added in an amount of 0.1 kg/t to 6.0 kg/t, the polyphenol derivative is added in an amount of 0.05 kg/t to 1.0 kg/t, and the sodium oleate-associated substance is added in an amount of 0.1 kg/t to 1.0 kg/t, and wherein the weight of the iron ore tailing used in the third conditioning step is same as the weight of the iron ore tailing used in the first conditioning step.

4. The method as claimed in claim 1, wherein in the first conditioning step, the first slurry has a concentration of 30 wt % to 45 wt %;

during the first flotation, a pH value of the first slurry is adjusted to 8 to 9.5; and the first flotation is conducted at a temperature of 20° C. to 35° C.

5. The method as claimed in claim 4, further comprising the step of third conditioning: conditioning the rare earth tailing to obtain a third slurry, adding the water glass, a polyphenol derivative, and the sodium oleate-associated substance sequentially to the third slurry to obtain a third mixture, and subjecting the third mixture to third flotation comprising one time of rough selection and multiple times of fine selection to obtain a fluorite concentrate and a fluorite tailing, wherein based on the weight of the iron ore tailing, the water glass is added in an amount of 0.1 kg/t to 6.0 kg/t, the polyphenol derivative is added in an amount of 0.05 kg/t to 1.0 kg/t, and the sodium oleate-associated substance is added in an amount of 0.1 kg/t to 1.0 kg/t, and wherein the weight of the iron ore tailing used in the third conditioning step is same as the weight of the iron ore tailing used in the first conditioning step.

6. The method as claimed in claim 1, wherein in the roasting and filtering step, the roasting is conducted for 1 h to 5 h; and a particle size of the ground product is controlled such that particles in the ground product that are able to pass through a 38 μm sieve account for 80 wt % to 90 wt %.

7. The method as claimed in claim 6, further comprising the step of third conditioning: conditioning the rare earth tailing to obtain a third slurry, adding the water glass, a polyphenol derivative, and the sodium oleate-associated substance sequentially to the third slurry to obtain a third mixture, and subjecting the third mixture to third flotation comprising one time of rough selection and multiple times of fine selection to obtain a fluorite concentrate and a fluorite tailing, wherein based on the weight of the iron ore tailing, the water glass is added in an amount of 0.1 kg/t to 6.0 kg/t, the polyphenol derivative is added in an amount of 0.05 kg/t to 1.0 kg/t, and the sodium oleate-associated substance is added in an amount of 0.1 kg/t to 1.0 kg/t, and wherein the weight of the iron ore tailing used in the third conditioning step is same as the weight of the iron ore tailing used in the first conditioning step.

8. The method as claimed in claim 1, wherein in the second conditioning step, the second slurry has a concentration of 50 wt % to 70 wt %;

during the second flotation, a pH value of the second slurry is adjusted to 8 to 9; and the second flotation is conducted at a temperature of 50° C. to 90° C.

9. The method as claimed in claim 8, further comprising the step of third conditioning: conditioning the rare earth tailing to obtain a third slurry, adding the water glass, a polyphenol derivative, and the sodium oleate-associated substance sequentially to the third slurry to obtain a third mixture, and subjecting the third mixture to third flotation comprising one time of rough selection and multiple times of fine selection to obtain a fluorite concentrate and a fluorite tailing, wherein based on the weight of the iron ore tailing, the water glass is added in an amount of 0.1 kg/t to 6.0 kg/t, the polyphenol derivative is added in an amount of 0.05 kg/t to 1.0 kg/t, and the sodium oleate-associated substance is added in an amount of 0.1 kg/t to 1.0 kg/t, and wherein the weight of the iron ore tailing used in the third conditioning step is same as the weight of the iron ore tailing used in the first conditioning step.

10. The method as claimed in claim 1, further comprising the step of third conditioning: conditioning the rare earth tailing to obtain a third slurry, adding the water glass, a polyphenol derivative, and the sodium oleate-associated substance sequentially to the third slurry to obtain a third mixture, and subjecting the third mixture to third flotation comprising one time of rough selection and multiple times of fine selection to obtain a fluorite concentrate and a fluorite tailing, wherein based on the weight of the iron ore tailing, the water glass is added in an amount of 0.1 kg/t to 6.0 kg/t, the polyphenol derivative is added in an amount of 0.05 kg/t to 1.0 kg/t, and the sodium oleate-associated substance is added in an amount of 0.1 kg/t to 1.0 kg/t, and wherein the weight of the iron ore tailing used in the third conditioning step is same as the weight of the iron ore tailing used in the first conditioning step.

11. The method as claimed in claim 10, wherein in the third conditioning step, the third slurry has a concentration of 30 wt % to 45 wt %;

during the third flotation, a pH value of the third slurry is adjusted to 8 to 9.5; and the third flotation is conducted at a temperature of 20° C. to 40° C.

12. The method as claimed in claim 10, wherein in first conditioning step and the third conditioning step, the sodium oleate-associated substance is sodium oleate; and the polyphenol derivative is at least one selected from the group consisting of tannin, a tannin extract, and gallic acid.

13. The method as claimed in claim 10, further comprising the step of combining the fluorite tailing with the mixed flotation grit to obtain a final tailing.

* * * * *